(12) United States Patent
Mildh et al.

(10) Patent No.: US 10,244,567 B2
(45) Date of Patent: Mar. 26, 2019

(54) ICN CONNECTIVITY AWARENESS

(71) Applicant: TELEFONAKTIEBOLAGET LM ERICSSON (PUBL), Stockholm (SE)

(72) Inventors: Gunnar Mildh, Sollentuna (SE); Hans Eriksson, Sollentuna (SE); Kim Laraqui, Solna (SE); Neiva Lindqvist, Vällingby (SE); Ala Nazari, Handen (SE); Börje Ohlman, Bromma (SE); Ioanna Pappa, Stockholm (SE); Dinand Roeland, Sollentuna (SE); Johan Rune, Lidingö (SE); Patrik Sellstedt, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 301 days.

(21) Appl. No.: 15/118,770

(22) PCT Filed: May 31, 2016

(86) PCT No.: PCT/SE2016/050510
§ 371 (c)(1),
(2) Date: Aug. 12, 2016

(87) PCT Pub. No.: WO2017/209667
PCT Pub. Date: Dec. 7, 2017

(65) Prior Publication Data
US 2018/0206278 A1 Jul. 19, 2018

(51) Int. Cl.
*H04L 29/08* (2006.01)
*H04W 76/12* (2018.01)
(Continued)

(52) U.S. Cl.
CPC ......... *H04W 76/12* (2018.02); *H04L 41/0654* (2013.01); *H04L 67/327* (2013.01);
(Continued)

(58) Field of Classification Search
CPC ... H04L 69/40; H04L 67/327; H04L 41/0654; H04W 76/10; H04W 76/12; H04W 36/0022; H04W 88/16; H04W 76/14
See application file for complete search history.

(56) References Cited

U.S. PATENT DOCUMENTS

2007/0072612 A1* 3/2007 Haraguchi ............ H04W 36/02
455/436
2010/0067467 A1* 3/2010 Cho .................... H04W 74/004
370/329

(Continued)

FOREIGN PATENT DOCUMENTS

WO 2016053159 A1 4/2016
WO 2017209668 A1 12/2017

OTHER PUBLICATIONS

Taleb, et al., Follow Me Cloud: Interworking Federated Clouds and Distributed Mobile Networks, IEEE Network, pp. 12-19, Sep./Oct. 2013.

(Continued)

*Primary Examiner* — Kim T Nguyen

(57) ABSTRACT

A method for enabling establishment of at least one Packet Data Network (PDN) connection between a wireless communication device and a communication network, and a wireless communication device performing the method of enabling establishment of at least one PDN connection with a communication network. The method comprises detecting whether connectivity to an Information Centric Networking (ICN) network is available via the at least one PDN connection for transporting ICN data.

19 Claims, 11 Drawing Sheets

(51) Int. Cl.
*H04W 76/14* (2018.01)
*H04W 36/00* (2009.01)
*H04W 88/16* (2009.01)
*H04L 12/24* (2006.01)
*H04W 76/10* (2018.01)
*H04L 29/14* (2006.01)

(52) U.S. Cl.
CPC ....... *H04W 36/0022* (2013.01); *H04W 76/10* (2018.02); *H04W 76/14* (2018.02); *H04W 88/16* (2013.01); *H04L 69/40* (2013.01)

(56) References Cited

U.S. PATENT DOCUMENTS

2013/0198373 A1* 8/2013 Zalmanovitch ....... H04L 43/045
709/224
2015/0223133 A1* 8/2015 Stojanovski ...... H04W 52/0251
370/230
2016/0057729 A1* 2/2016 Horn ..................... H04W 48/18
455/458
2017/0034055 A1* 2/2017 Ravindran ............ H04W 40/20

OTHER PUBLICATIONS

3GPP TS 23.401 V13.6.1 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2016.

Karimzadeh, et al., Utilizing ICN/CCN for service and VM migration support in virtualized LTE systems, Apr. 3, 2014.

3GPP TR 22.891 V14.0.0 3rd Generation Partnership Project; Technical Specification Group Services and System Aspects; Feasibility Study on New Services and Markets Technology Enablers; Stage 1 (Release 14), Mar. 2016.

* cited by examiner

ICN CONNECTIVITY AWARENESS

This application is a 371 of International Application No. PCT/SE2016/050510, filed May 31, 2016, the disclosure of which is fully incorporated herein by reference.

TECHNICAL FIELD

The invention relates to a method for enabling establishment of at least one Packet Data Network (PDN) connection between a wireless communication device and a communication network, and a wireless communication device performing the method.

Moreover, the invention relates to a computer program comprising computer-executable instructions for causing the wireless communication device to perform steps of the method according to embodiments, when the computer-executable instructions are executed on a processing unit included in the wireless communication device.

The invention further relates to a computer program product comprising a computer readable medium, the computer readable medium having the computer program of the wireless communication device embodied thereon.

BACKGROUND

Over recent years, Information/Content Centric Networking (ICN/CCN) is gaining momentum as a future technology for 5th generation mobile networks ("5G") and other coming technologies for media distribution, device software upgrades and the Internet of Things (IoT).

Information Centric Networking and Content Centric Networking are sometimes also referred to as Named Data Networking (NDN). In the following, the term ICN will be used to encompass ICN, CCN and NDN technology.

ICN may be utilized for delivery of content to a wireless communications device, commonly referred to as a User Equipment (UE), over e.g. a 3rd Generation Partnership Project (3GPP) network, where the UE may be embodied in the form a smart phone, tablet, laptop, a gaming console, etc., or a so called fixed wireless terminal (FWT) in the form of e.g. a television set, a computer, or a set top box.

In contrast to traditional Internet Protocols (IPs), ICN addresses content objects using globally unique names instead of IP addresses.

FIG. 1 illustrates a general operating principle of prior art ICN content request and delivery. This operating principle assumes that a link used in one direction—e.g. between ICN Node 1 and ICN Node 2 essentially being switches equipped with large caches for transporting content—to send content requests from subscribers is also used in the other direction to send the corresponding content back via ICN Node 1 and ICN Node 2 from a content provider to the subscribers. All links in ICN are therefore assumed to allow for bi-directional communication. A request in ICN terminology is commonly referred to as an "interest".

Multicast support is a key feature in ICN when transporting a particular content from a content provider to various subscribers/end users whom have requested content from that particular content provider. Whenever a node which has received content requests from several subscribers over different interfaces (each node being illustrated to comprise four interfaces in FIG. 1) receives requested content available for delivery, the node will deliver the requested content to the subscribers over a respective interface.

With reference to FIG. 1, if both Subscriber 1 and 2 request the same content, e.g. a live video stream, both subscribers will submit a request/interest to ICN Node 1. However, ICN Node 1 will only forward a single request to ICN Node 2 for that video stream, and ICN Node 2 will as a result forward the single request towards the content provider. The content provider will thereafter return a single copy of the requested live stream to ICN Node 2. Likewise, ICN Node 2 will only send one copy of the live stream over its link to ICN Node 1. ICN Node 1 will then replicate the content of the video stream and send it to both Subscriber 1 and 2.

To the contrary, should ICN node 1 already have the requested content in its cache, it will deliver the content to the requesting subscriber(s) without submitting any further upstream request to ICN Node 2.

The routing of interests is helped by the name of a requested piece of content being a structured name (similar to domain names, but with richer syntax). Routing ICN nodes maintain a Forwarding Information Base (FIB) about where, i.e. across which interface, the name or name prefix should be forwarded. The routing ICN nodes along the path of the travelling interest message keep a record of the interest messages they have forwarded (the interface it came from and the content object it was naming) in their Pending Interest Table (PIT).

As can be concluded, when the interest message reaches an ICN node having a copy of the content object, the content object is propagated backwards along the path the interest message took. The backward path is learned from the entries the interest message left in the PIT of the ICN nodes along the path. If there were multiple interests arriving at an ICN node for a content object address by a particular name, the content object is replicated towards each respective interface/direction the interest messages came from. After forwarding a content object matching a pending interest, the ICN nodes delete the corresponding entry in the PIT. When the original endpoint(s) generating the interest message(s) receive the content object, the transaction is considered finalized.

If other interest messages addressing the same content object arrive at a routing ICN node, it does not forward them, just notes them in the PIT along the entry for the named content object, which is referred to as interest aggregation. This way the PIT entries for the same name (i.e. the same content object) may form a tree in the network with receiver of the interests as the leaves. Interest aggregation is particular advantageous in case of a flash crowd event where suddenly thousands of endpoints are requesting the same content, since the source will only be reached by one request for the content, all other requests will be served from the caches of routers along the path towards the source.

As can be concluded, ICN technology provides for an efficient, scalable and flexible approach of delivering information to an end-user.

A problem with implementing ICN technology in wireless communication networks is that there is no way for the UE to know whether the network with which the UE connects is capable of setting up a connection with an ICN node, i.e. whether the network is ICN compatible.

In the art, when a client such as the mentioned UE requests ICN content, it periodically sends ICN interests addressed and routed by means of the name of the requested ICN content as described in the above, and it will do so either until a preset timer expires, or after a predetermined number of ICN interests have been sent (or until the client ultimately is granted ICN access), which causes signalling load on the network. Further, since the time from the sending of an ICN interest to the instant where it can be concluded that the requested ICN content is not returned back (due to variations in network conditions)—and the ICN interest is re-submitted—may be relatively long, it is a risk that the user of the UE will perceive Quality of Experience (QoE) as being low.

SUMMARY

An object of the present invention is to solve, or at least mitigate, this problem in the art and thus to provide an improved method of enabling establishment of a Packet Data Network (PDN) connection with a communication network for a wireless communication device.

This object is attained in a first aspect of the invention by a method performed at a wireless communication device of enabling establishment of at least one PDN connection with a communication network. The method comprises detecting whether connectivity to an Information Centric Networking (ICN) network is available via the at least one PDN connection for transporting ICN data.

This object is attained in a second aspect of the invention by a wireless communication device configured to enable establishment of at least one PDN connection with a communication network. The wireless communication device comprises a processing unit and a memory, which memory contains instructions executable by the processing unit, whereby the wireless communication device is operative to detect whether connectivity to an ICN network is available via the at least one PDN connection for transporting ICN data.

Advantageously, by more or less instantly detecting whether the communications network is capable of providing access to an ICN network, the wireless communication device is not required to periodically send ICN requests to a network which is not capable of providing ICN connectivity. By continuously detecting whether connectivity to an ICN network is available via the at least one PDN connection during the lifetime of the established PDN connection, any changes in ICN compatibility may be detected, such as for example in a scenario where the wireless communication device is handed over to a target cell which does not provide access to an ICN network, or if the network would perform a PDN connection detach, or bearer release. The wireless communication device may correspondingly determine that any ICN communication is to be terminated upon such detection, and any unnecessary ICN signalling may advantageously be avoided.

In an embodiment, the wireless communication device submits, to a node of the communication network, such as a Mobility Management Entity (MME), a request to establish the PDN connection with the ICN network, wherein the detecting whether connectivity to an ICN network is available comprises receiving, from the node of the communication network, a message indicating whether the communication network is capable of establishing the PDN connection with the ICN network for transporting ICN data.

In another embodiment, the submitted request further comprises information identifying at least one ICN network with which the PDN connection is requested to be established for transporting ICN data.

In a further embodiment, the received message further comprises information identifying at least one ICN network with which the PDN connection is established for transporting ICN data.

In still another embodiment, the detecting whether connectivity to an ICN network is available comprises, receiving, from a node of the communication network, being e.g. the above mentioned MME, a message indicating that the PDN connection with the ICN network is established for transporting ICN data.

In an embodiment, any pending requests for ICN content at the wireless communication device is submitted upon receiving the message indicating that the PDN connection with the ICN network is established for transporting ICN data.

In a further embodiment, the wireless communication device detects whether connectivity to the ICN network no longer is available via the at least one PDN connection for transporting ICN data.

In yet a further embodiment, the wireless communication device detects that a request for ICN data failed to be delivered via the established PDN connection, and re-submits, upon detecting the failure to deliver the request, the request for ICN data.

In still a further embodiment, the wireless communication device detects that the requested ICN data failed to be delivered via the established PDN connection, and re-submits, upon detecting the failure to deliver the requested ICN data, the request for the ICN data for which delivery failed.

In an embodiment, the wireless communication device re-submits, upon detecting the failure of delivery, the request for ICN data via the PDN connection over which the failure occurred.

In an alternative embodiment, the wireless communication device re-submits, upon detecting the failure of delivery, the request for ICN data via a different PDN connection.

In yet a further embodiment, the wireless communication device receives, from a node (e.g. an MME) of the communication network, an indication that an inter-cell handover of the wireless communication device is performed from a source cell to a target cell, and re-submits any previously sent request for ICN data, which has not yet been served by the handover source cell, to the handover target cell.

In still a further embodiment, the wireless communication device receives, from a node (e.g. an MME) of the communication network, an indication that an intra-cell handover of the wireless communication device is performed, and re-submits, in case an ICN node of the ICN network with which the PDN connection was established before the intra-cell handover was performed no longer is available, any previously sent request for ICN data which has not yet been served, to another ICN node of the ICN network with which the PDN connection is established after the intra-cell handover.

In still another embodiment, the wireless communication device detects a bearer release over the PDN connection, and cancels any requests for ICN data which has not yet been served by the ICN network, wherein no new requests for ICN data are sent over the PDN connection until a new bearer is set up.

Further provided is a computer program comprising computer-executable instructions for causing the wireless communication device to perform steps according to an embodiment of a method of the invention, when the computer-executable instructions are executed on a processing unit included in the node.

Further provided is a computer program product comprising a computer readable medium, the computer readable medium having the computer program of the node embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
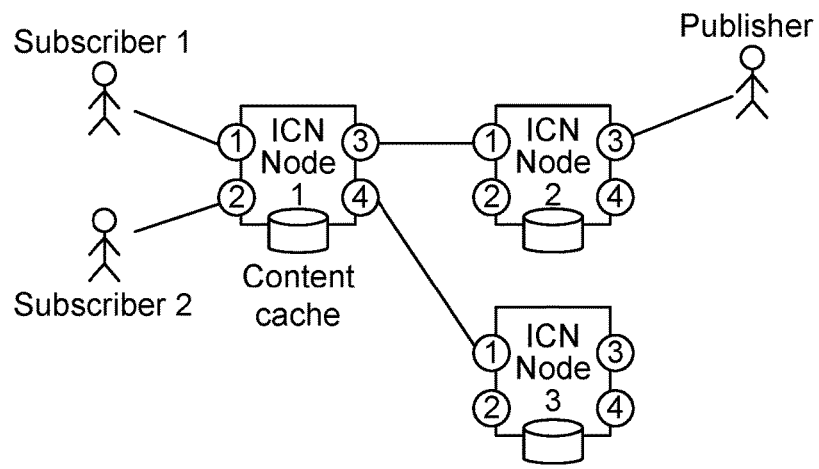
FIG. 1 illustrates an ICN-type network.

FIG. 1 shows an ICN-type network, the general principles of which previously have been discussed.

Figure 2:
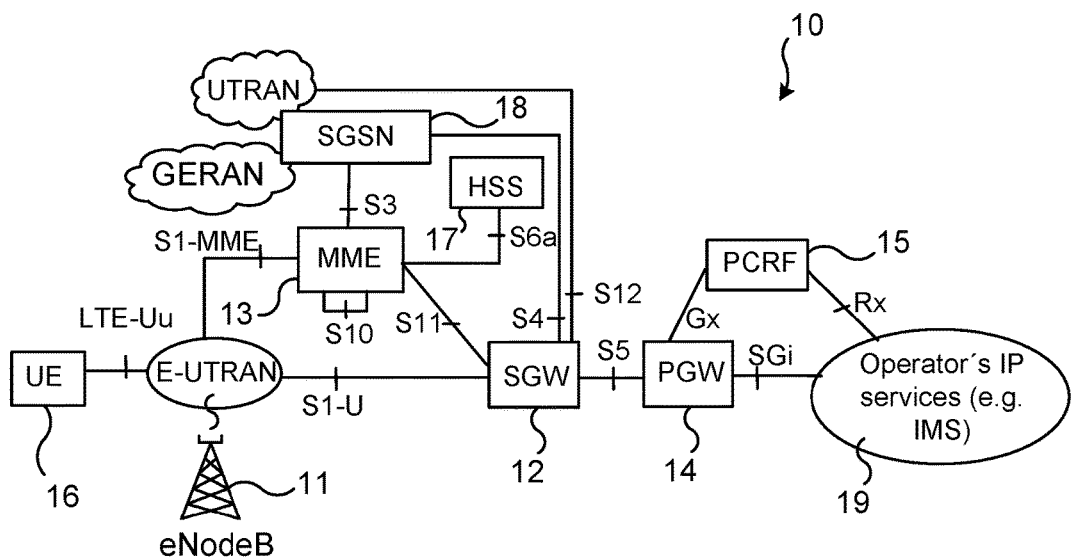
FIG. 2 shows a schematic overview of an exemplifying wireless communication system in which embodiments of the present invention may be implemented.

FIG. 2 shows a schematic overview of an exemplifying wireless communication system 10 in which embodiments of the present invention may be implemented. The wireless communication system 10 is a Long Term Evolution (LTE) based system. It should be pointed out that the terms "LTE" and "LTE based" system is here used to comprise both present and future LTE based systems, such as, for example, advanced LTE systems, and 5G systems. It should be appreciated that although FIG. 1 shows a wireless communication system 10 in the form of an LTE based system, the example embodiments herein may also be utilized in connection with other wireless communication systems, such as e.g. Global System for Mobile Communications (GSM) or Universal Mobile Telecommunications System (UMTS), comprising nodes and functions that correspond to the nodes and functions of the system in FIG. 1.

The wireless communication system 10 comprises a base station in the form of an eNodeB 11, operatively connected to a Mobility Management Entity (MME) 13 and to a Serving Gateway (SGW) 12, in turn operatively connected to the MME 13, and a Packet Data Network Gateway (PGW) 14, which in turn is operatively connected to a PCRF 15. The eNodeB 11 is a radio access node that interfaces with a mobile radio terminal, commonly referred to as a User Equipment (UE) 16 in the form of e.g. smart phone, tablet, laptop, gaming console, etc.

The PGW 14 provides connectivity to the UEs to external Packet Data Networks (PDNs) 19 by being the point of exit and entry of traffic for the UE with respect to the PDNs. A UE may have simultaneous connectivity with more than one PGW for accessing multiple PDNs, or multiple connections to a single PGW for accessing multiple PDNs.

The eNodeB(s) of the system form the Evolved Universal Terrestrial Radio Access Network (E-UTRAN) for LTE communicating with the UE over an air interface such as LTE-Uu. The core network in LTE is known as EPC, and the EPC together with the E-UTRAN is referred to in LTE as the EPS. The SGW 12 routes and forwards user data packets over the S1-U interface, whilst also acting as the mobility anchor for the user plane during inter-eNodeB handovers and as the anchor for mobility between LTE and other 3GPP technologies (terminating S4 interface and relaying the traffic between 2G/3G systems and the PGW 14). For idle state UEs, the SGW 12 terminates the downlink (DL) data path and triggers paging when DL data arrives for the UE 16, and further manages and stores UE contexts, e.g. parameters of the IP bearer service, network internal routing information. It also performs replication of the user traffic in case of lawful interception. The SGW 12 communicates with the MME 13 via interface S11 and with the PGW 14 via the S5 interface. Further, the SGW 12 may communicate with the UMTS radio access network Universal Terrestrial Radio Access Network (UTRAN) and with the GSM EDGE ("Enhanced Data rates for GSM Evolution") Radio Access Network (GERAN) via the S12 interface.

The MME 13 is responsible for idle mode UE tracking and paging procedure including retransmissions. It is involved in the bearer activation/deactivation process and is also responsible for choosing the SGW 12 for a UE 16 at the initial attach and at time of intra-LTE handover involving core network node relocation. It is responsible for authenticating the user by interacting with the Home Subscriber Server (HSS) 17. The Non-Access Stratum (NAS) signaling terminates at the MME 13 and it is also responsible for generation and allocation of temporary identities to UEs via the S1-MME interface. It checks the authorization of the UE 16 to camp on the service provider's Public Land Mobile Network (PLMN) and enforces UE roaming restrictions. The MME 13 is the termination point in the network for ciphering/integrity protection for NAS signaling and handles the security key management. Lawful interception of signaling is also supported by the MME. The MME 13 also provides the control plane function for mobility between LTE and 2G/3G access networks with the S3 interface terminating at the MME 13 from a Serving GPRS ("General Packet Radio Service") Support Node (SGSN) 18. The MME 13 also terminates the S6a interface towards the home HSS 17 for roaming UEs. Further, there is an interface S10 configured for communication between MMEs for MME relocation and MME-to-MME information transfer.

The PGW 14 provides connectivity to the UE 16 to external PDNs 19 by being the point of exit and entry of traffic for the UE 16. The PGW 14 performs policy enforcement, packet filtering for each user, charging support, lawful interception and packet screening. Another key role of the PGW 14 is to act as the anchor for mobility between 3GPP and non-3GPP technologies such as WiMAX and 3GPP2 (CDMA 1× and EvDO), and also for handover involving core network node relocation. The interface between the PGW 14 and the packet data network is referred to as the SGi. The packet data network may be an operator external public or private packet data network or an intra operator packet data network, e.g. for provision of IP Multimedia Subsystem (IMS) services.

The PCRF 15 determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF 15 provides the PGW 14 with such rules and/or policies or similar to be used by the PGW acting as a Policy and Charging Enforcement Function (PCEF) 20 via interface Gx. The PCRF further communicates with the packet data network via the Rx interface.

Figure 3:
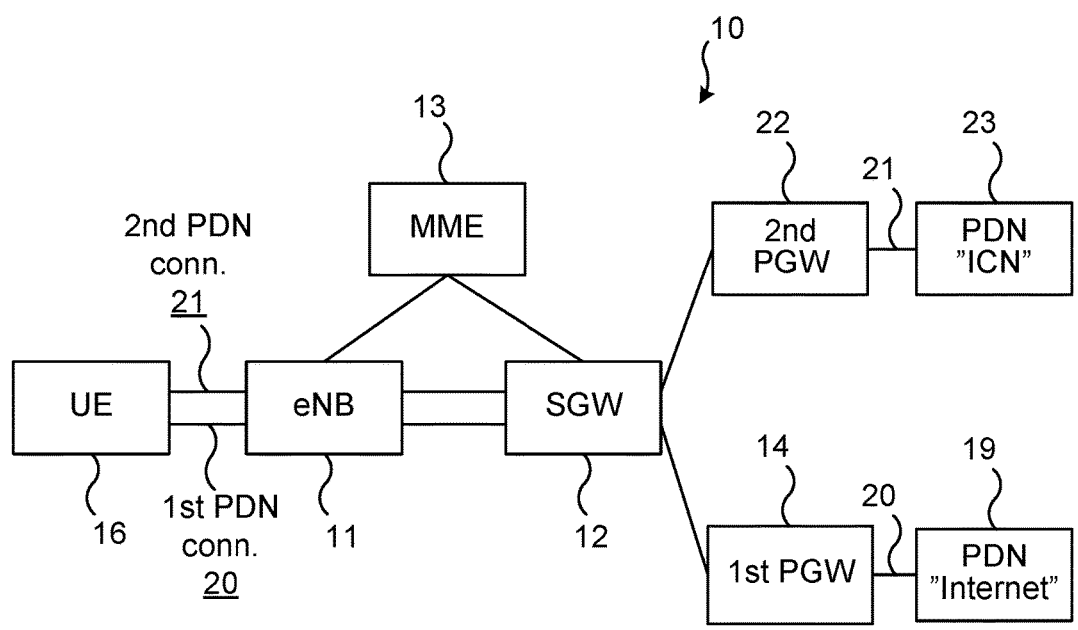
FIG. 3 illustrates a communication network where an embodiment is implemented for enabling establishment of a PDN connection between a UE and an ICN PDN.

FIG. 3 illustrates a communication network 10 in the form of a simplified LTE network, discussed in more detail with reference to FIG. 2, where an embodiment is implemented for enabling establishment of a PDN connection between a UE 16 and a PDN 23 being an ICN-type network.

Assuming that the UE 16 is connected by means of a first PDN connection 20 to a first PDN 19, e.g. the Internet, via a first PGW 14 and wishes to establish a further PDN connection 21 to a second PDN 23, referred to as an "ICN PDN", via a second PGW 22, it is desirable that the UE 16 detects whether connectivity to the ICN network 23 is available via a second PDN connection 21 for transporting ICN data from the ICN network 23.

To this end, in an embodiment, the UE 16 will, upon submitting a request to MME 13 (effectively managing the PDN connection setup) via the eNodeB 11 to have the ICN PDN connection 21 established, receive a confirmation from the MME 13 that the network 10 indeed is capable of connecting the UE 16 to the ICN network 23.

Thereafter (or simultaneously), the MME 13 will establish the second PDN connection 21—i.e. a designated ICN PDN connection—with the second PGW 22 for UE access to the ICN-type PDN 23.

It is noted that a single PGW could handle both the first PDN connection 20 and the second ICN PDN connection 21 towards the PDN 19 and the ICN PDN 23, respectively.

The information submitted by the MME 13 to the UE 16 that the network 10 is ICN compatible can be transferred as part of Radio Resource Control (RRC) signalling, either as broadcasted or unicasted system information, or NAS signalling during initial connection setup with the network 10 or it can be transferred during RRC or NAS signalling at handover of the UE 16 to the network 10, or during a paging process for having the UE 16 exit an IDLE mode.

Now, as will be described in the following, in an embodiment of the invention a method is performed at a wireless communication device, embodied throughout the description with the UE 16, of enabling establishment of at least one PDN connection 21 with a communications network 10, where the UE 16 detects whether connectivity to an ICN network 23 is available via the at least one PDN connection 21 for transporting ICN data. Advantageously, by instantly detecting whether the communications network 10 is capable of providing access to an ICN network 23, the UE 16 is not required to periodically send ICN requests to a network 10 which is not capable of providing ICN connectivity.

By continuously detecting whether connectivity to an ICN network 23 is available via the at least one PDN connection 21 during the lifetime of the established PDN connection 21, any changes in ICN compatibility may be detected, such as for example in a scenario where the UE 16 is handed over to a target cell which does not provide access to an ICN network, even though a source cell from which the UE 16 was handed over very well may provide ICN access.

Figure 4A:
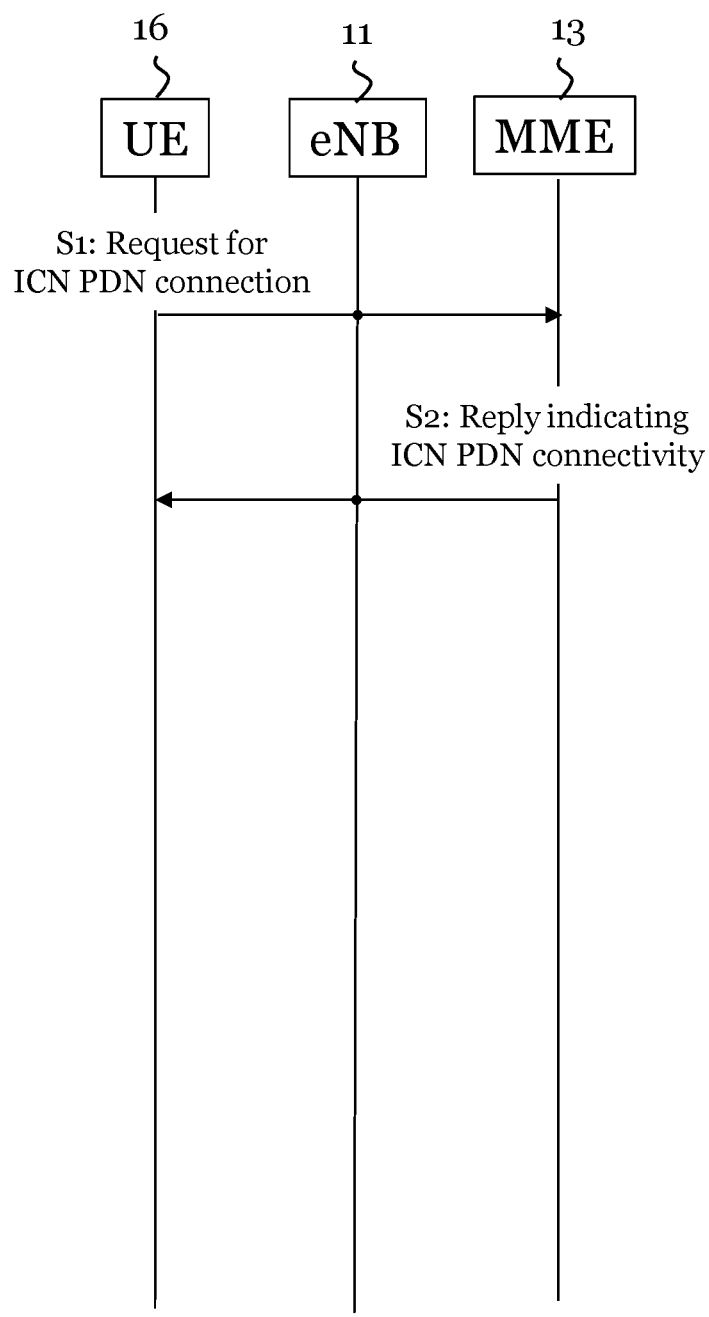
FIGS. 4a-c show sequence diagrams illustrating detection of ICN compatibility of the network at a wireless communication device according to embodiments.
Figure 4B:
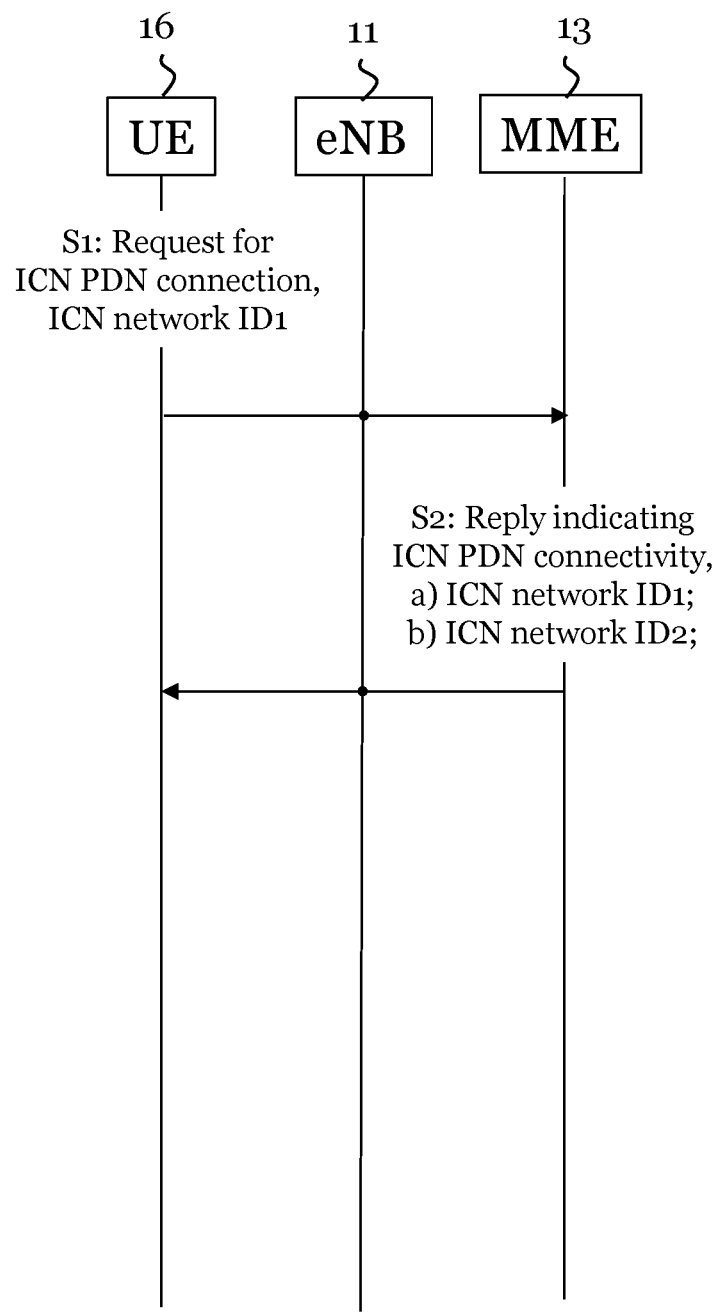
Figure 4C:
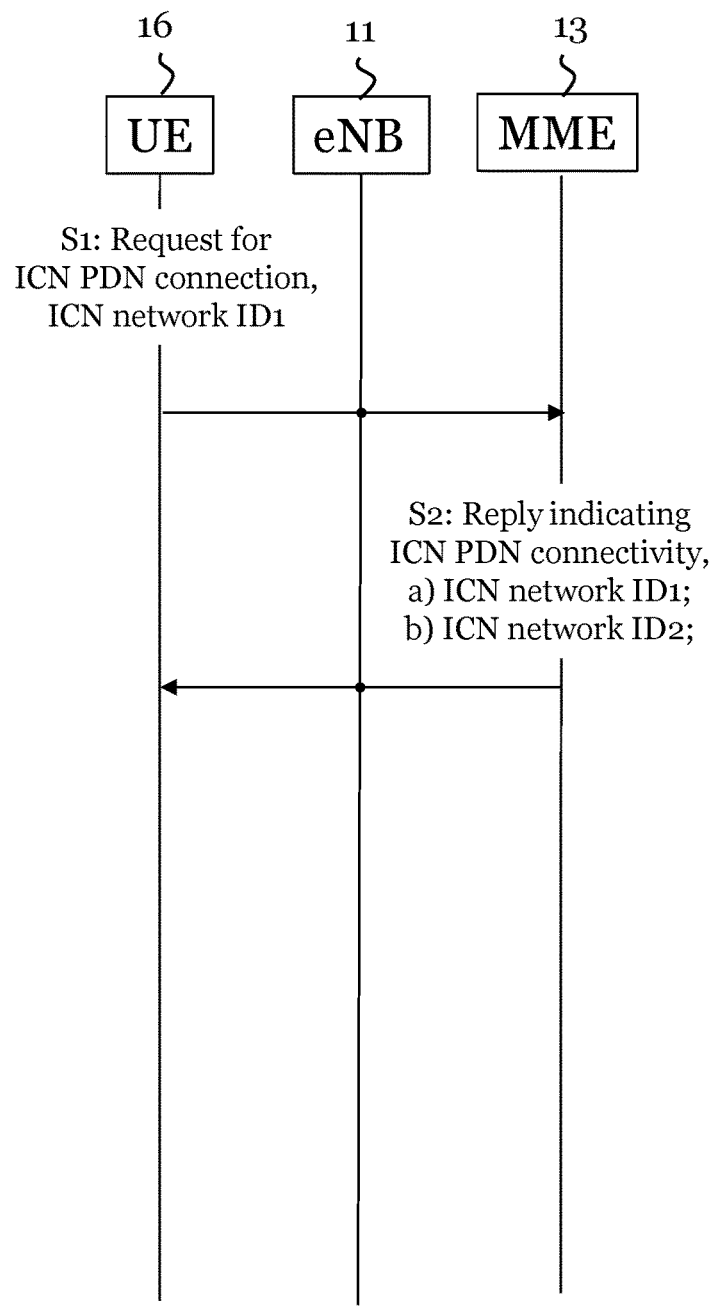

Now, FIGS. 4a-c discloses various embodiments of detecting at the UE 16 whether the communications network 10 is capable of establishing a PDN connection 21 with an ICN network 23 (not shown in FIGS. 4a-c). It is noted that only a few network nodes is illustrated in FIGS. 4a-3c, and that a more detailed description of the communications network 10 will be given in subsequent drawings. It is further noted that "capable" in this regard may imply whether an operator of the network 10 have access to an ICN network at all, but it may also imply that a particular user does not have access to one or more (or any) ICN networks (such as "TV-Media", "IoT", "Dedicated to large enterprises", "Dedicated to users having a specific subscription profile", etc.) provided by the operator. In such a case, the communications network 10 may not be capable of establishing a PDN connection with an ICN network for the user.

FIG. 4a shows a sequence diagram illustrating detection of ICN compatibility of the network 10 at the UE 16 according to an embodiment. In a first step S1, the UE 16 submits via the eNodeB 11 to a node in the communication network 10, which typically is the MME 13, a request to establish a PDN connection 21 with an ICN network.

In reply to the request, the MME 13 replies in step S2, via the eNodeB 11, to the UE 16 with a message indicating whether the communication network 10 is capable of establishing the PDN connection 21 with the ICN network 23 for transporting ICN data. As will be described in more detail with reference to subsequent drawings, this may be part of a so called Attach procedure. Advantageously, with the indication that an ICN PDN connections 21 indeed can be established by the network 10 (or alternatively cannot be established), there is no need for the UE 16 to repeatedly submit the requests for ICN content (either for a predetermined number of times or until expiration of a preset timer).

Again with reference to FIG. 4a, in a further embodiment, the message received at the UE 16 in step S2 from the MME 13 via the eNodeB 11 further comprises information identifying at least one ICN node of the ICN network 23 with which the PDN connection 21 is established for transporting ICN data.

FIG. 4b shows a sequence diagram illustrating detection of ICN compatibility of the network 10 at the UE 16 according to a further embodiment. In a first step S1, the UE 16 submits via the eNodeB 11 to a node in the communication network 10, which typically is the MME 13, a request to establish a PDN connection 21 with an ICN network 23.

In this embodiment, the UE 16 adds an identifier ICN network ID1 for identifying the ICN network 23 (there are possibly numerous ICN networks that the UE may connect to) with which it wishes to establish the PDN connection 21.

In reply to the request, the MME 13 replies in step S2, via the eNodeB 11, to the UE 16 with a message indicating whether the communication network 10 is capable of establishing the PDN connection 21 with the designated ICN network 23 for transporting ICN data.

As can be seen in alternative a), the MME 13 replies by including ICN network ID1 if that particular network is available. However, as illustrated in alternative b), it may also be envisaged that the ICN network designated in the request from the UE 16 is not available, in which case the MME 13 may reply by identifying another ICN network (ICN network ID2) with which the PDN connection 21 is established.

It may further be envisaged that the MME 13 does not include an ICN network ID in its reply, even if the UE 16 included an ICN network ID in its request.

FIG. 4c shows a sequence diagram illustrating detection of ICN compatibility of the network 10 at the UE 16 according to yet a further embodiment. In this particular embodiment, the establishment of an ICN PDN connection is not initiated by the UE 16, but by the MME 13 of the communication network 10.

Hence, the UE 16 receives in step S1116, from the MME 13 via the eNodeB 11, a PDN connectivity setup message indicating that the PDN connection with the ICN network is established for transporting ICN data.

Again, with the indication that an ICN PDN connections indeed can be established by the network 10, there is advantageously no need for the UE 16 to repeatedly submit the requests for ICN content (either for a predetermined number of times or until expiration of a preset timer).

Figure 5:
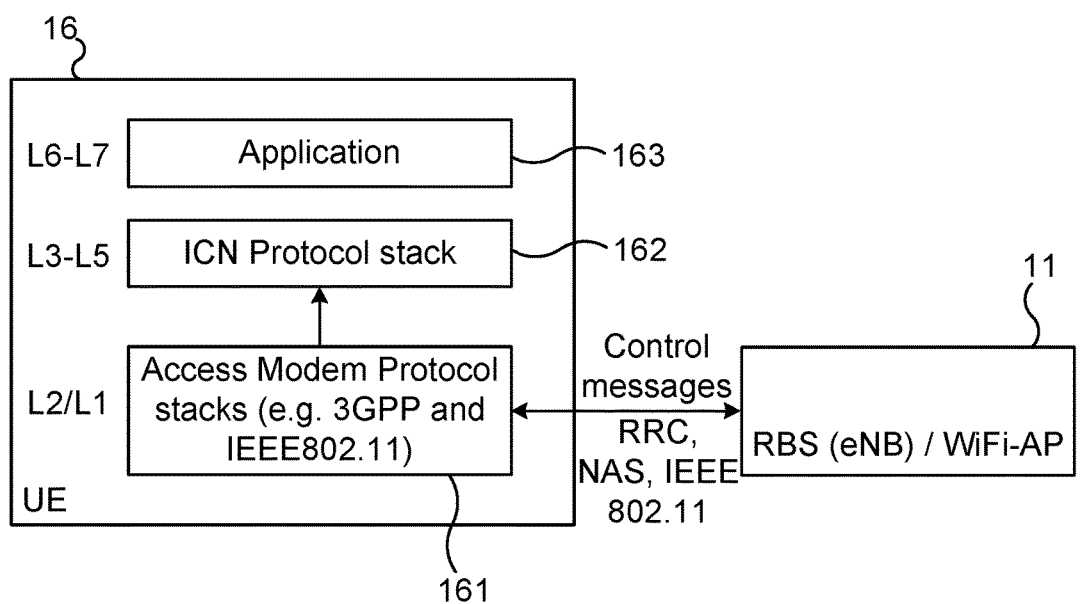
FIG. 5 illustrates internal functionality of a wireless communication device in terms of handling ICN communication.

FIG. 5 illustrates internal functionality of a UE 16 in terms of handling ICN communication. At the lowest protocol layers—physical layer (L1) and data layer (L2)—access modem protocol stacks 161 are arranged, where the UE 16 may access an ICN network via e.g. an eNodeB 11 or a Wireless Local Area Network (WLAN, commonly known as "WiFi") access point (AP).

An ICN protocol stack 162 designated for handling ICN communication is arranged at the next three protocol layers—network layer (L3), transport layer (L4) and session layer (L5). Thus, the implementation of the ICN protocol stack 162 in the UE 16 is done "above" the access modems stacks 161 (e.g. 3GPP, IEEE 802.11) as regards the protocol layers. Depending on UE type (smart phone, Machine Type Communication (MTC) device, laptop, TV set, etc.), the ICN stack 162 could be included as part of the operating system (OS) in a similar way as a TCP/IP stack is included, or as a separate middleware.

Finally, the application 163 itself utilizing any received ICN data, being e.g. a media player for rendering ICN data is implemented at the final two protocol layers—presentation layer (L6) and application layer (L7).

Upon the UE 16 detecting that the network 10 is ICN compatible as was described with reference to FIGS. 4a-4c, the access modem protocol stack 161 sends a trigger to the ICN protocol stack 162 accordingly, wherein setting of timers or counters for sending ICN interests/requests advantageously is avoided.

State transitions resulting in the trigger being sent include:
UE is attached and authorized to be connected to the network and further authorized to be connected to an ICN network,
UE detaches from the network,
Additional bearer of type ICN is setup,
Bearer release for an ICN-type bearer,
UE is handed over to a different base station, and
ICN node ID changes.

Figure 6:
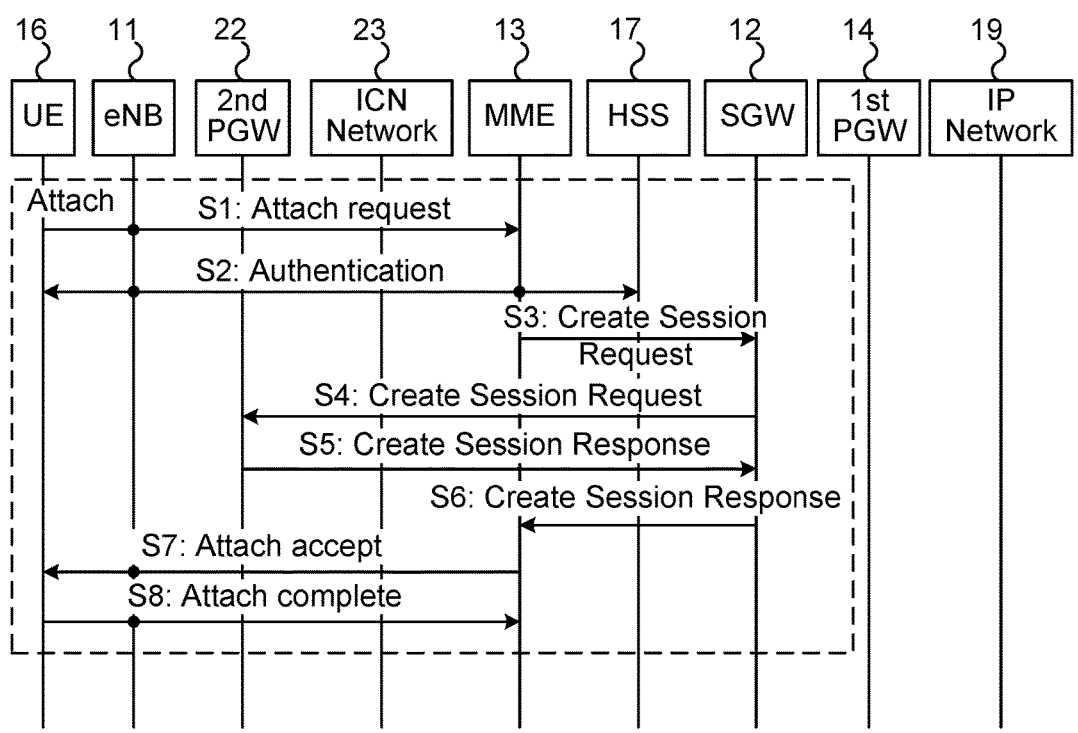
FIG. 6 illustrates a sequence diagram according to an embodiment, showing detection of an ICN compatible network.

FIG. 6 illustrates a sequence diagram according to an embodiment, showing how an ICN PDN connection is setup. In this exemplifying embodiment, the ICN PDN connection is set up as part of an initial attach procedure (described for instance in FIG. 5.3.2.1-1 of 3GPP TS 23.401). Reference is further made to the network 10 of FIG. 3.

In step S1, the UE 16 initiates establishment of a PDN connection with the network 10 by submitting an Attach Request to the MME 13 via the eNodeB 11, which Attach Request comprises an indication that connection to an ICN network 23 is requested.

Upon receiving the Attach Request, the MME 13 optionally performs an authentication procedure S2 (typically consisting of a number of messages being exchanged) with the UE 16 and the HSS 17, for instance by verifying that an IMSI of the UE 16 is registered with the HSS 17, and if so verifying from a subscription profile that a user of the UE 16 is authorized to connect to one or more ICN networks, typically designated by means of different ICN network IDs as previously discussed.

Advantageously, the MME 13 may submit a message via the eNodeB 11 to the UE 16 informing that the network 10 indeed is ICN capable already in step S2 to avoid any further signalling in case the network 10 is not ICN enabled and consequently cannot setup an ICN PDN connection to the UE 16. Further, by the MME 13 rapidly sending the ICN-capability message in S2, the UE 16 instantly detects of the ICN-capability feature of the network, meaning that the ICN protocol stack 162 of the UE 16 does not need to reserve resources for submitting ICN interests until the ICN PDN connection 21 has been setup.

Within the UE 16, any ICN interests sent from the application 163 to the ICN stack 162 before the ICN-capability message is received may be cached at the ICN stack 162, or even rejected. As previously discussed, the Attach Request in step S1 may further comprise an ICN network/node ID.

Thereafter, in S3, the MME 13 submits a Create Session Request to the SGW 12, indicating that a gateway supporting ICN (in this case the second PGW 22) has been selected for setting up the ICN PDN connection as indicated in the Attach Request initially submitted in step S1. Hence, the Create Session Request of S3 to the SGW 12 will contain the address of the second PGW 22. Alternatively, the eNodeB 11 selects the second PGW 22 and informs the MME 13 accordingly in step S1. Either way, the MME 13 will inform the SGW 12 about the selection in step S3.

In step S4, the Create Session Request is thus sent from the SGW 12 to the second PGW 22, which responds with a Create Session Response in step S5, and the SGW 12 in its turn responds by submitting the Create Session Response in step S6 to the MME 13.

As a final step of establishing the ICN PDN connection with the PDN-type ICN network 23, the MME 13 sends, via the eNodeB 11, an Attach Accept message to the UE 16 in step S7, which responds with an Attach Complete message in step S8.

In case no authentication of step S2 is performed, the MME 13 informs the UE 16 about the network 10 being capable of setting up the PDN connection with the ICN network 23 in step S7. When the access modem protocol stack 161 of the UE receives Attach Accept message in step S7 with ICN network information indicating that access is granted to the operator's ICN network 23, the modem stack 161 sends a trigger "Connected" to the ICN protocol stack 162. Different variants can be envisaged regarding the triggers; for example "Access Granted" indicating that access is granted (and ICN capable) but no connection is yet established and "Connected" if a connection further is established to the ICN network 23.

In case the access network is a WiFi network, access using EAP ("Extensible Authentication Protocol") authentication, the trigger "Connected" is sent when the UE 16 (and thus the modem stack 161) receives an EAP Success message.

Advantageously, a PDN connection has been established between the UE 16 and the ICN network 23 with the second PGW 22 serving as an ICN network gateway.

Figure 7:
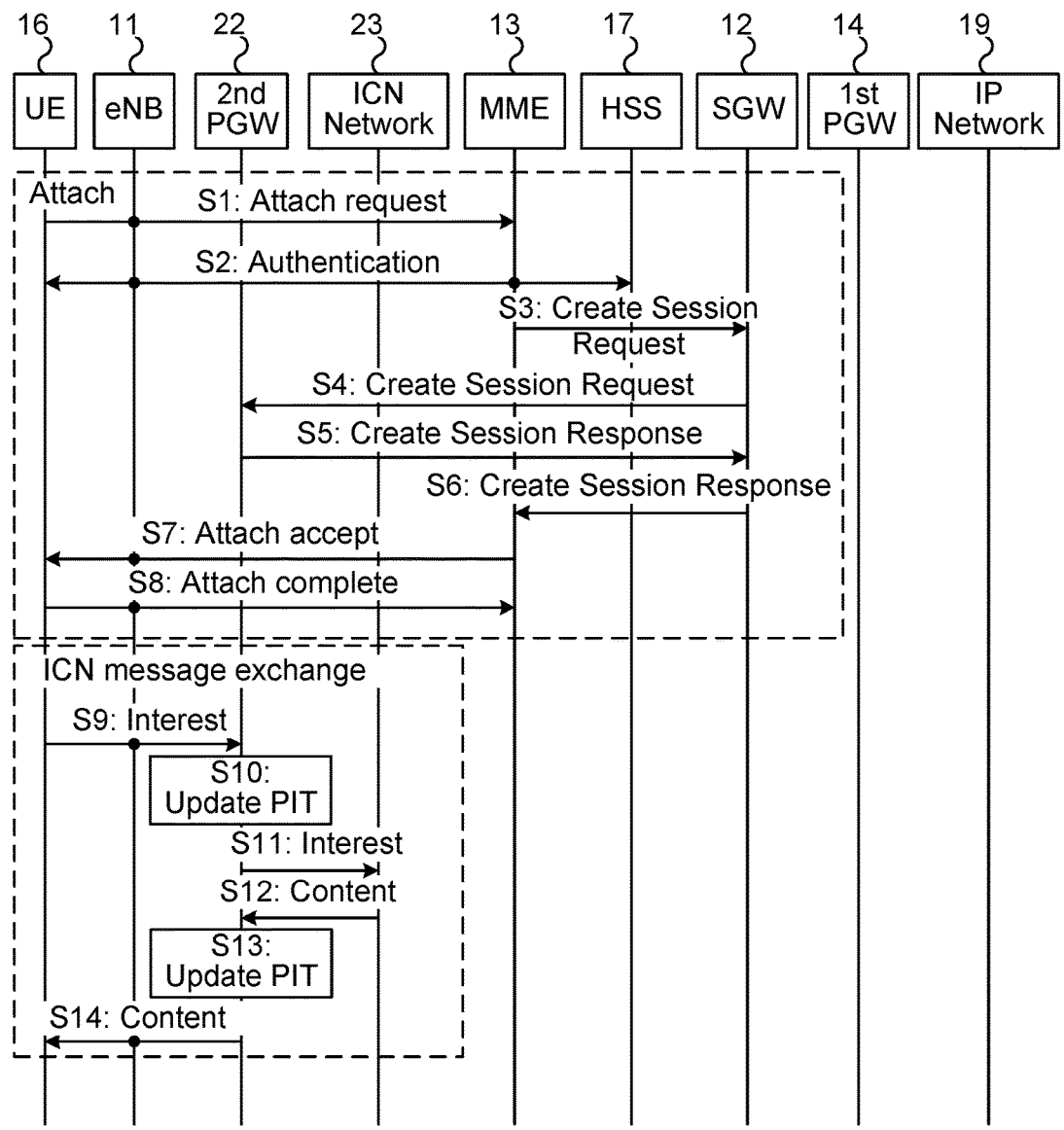
FIG. 7 further illustrates a sequence diagram according to an embodiment, where exchange of ICN messages between the wireless communication device and the ICN network is performed.

FIG. 7 further illustrates exchange of ICN messages between the UE 16 and the ICN network 23 in an embodiment, and delivery of requested ICN content. Hence, after the ICN PDN connection to the ICN network 23 has been setup, the UE 16 sends an interest via the eNodeB 11 to the ICN network 23 (i.e. in practice to an ICN node in the ICN network) in step S9, thereby requesting ICN content.

As previously discussed, any node routing interests to an ICN network keeps a record of the interest messages it has forwarded (i.e. where the interest message came from and what Content Object it was naming) in their Pending Interest Table (PIT). As a consequence, the second PGW 22 updates in step S10 its PIT in the light of the interest that just was received from the UE 16.

In step S11, the interest is forwarded to one or more ICN nodes (not shown) in the ICN network 23, which in their turn may forward the interest to further ICN nodes until the requested content is found. Subsequently, in step S12, the ICN network 23 submits the requested content to the second PGW 22, which again updates the PIT in step S13, and forwards the requested content to the UE 16 via the eNodeB 11 in step S14.

In an embodiment, after the attach procedure is completed in step S7 and ICN message exchange may commence via the established ICN PDN connection 21, any cached pending requests for ICN content at the UE 16 are submitted to the network 10 in step S9.

From this point on, the sending of ICN requests and replies continues as long as the ICN network is available (and the user wishes to fetch ICN content).

In a further embodiment, similar to the attach procedure described with reference to FIG. 6, in a detach procedure starting with a Detach Request and ending with a Detach Accept, the UE 16 will again detect whether connectivity to the ICN network 23 is available.

Hence, in such an embodiment, the MME 13 will send a Detach Accept to the UE 16 via the eNodeB 11, indicating that the previously established PDN connection no longer is available for providing connectivity to the ICN network 23. Advantageously, the ICN protocol stack 162 of the UE 16 is informed accordingly, and no further requests for ICN content are submitted, thereby avoiding any excessive signaling.

Figure 8:
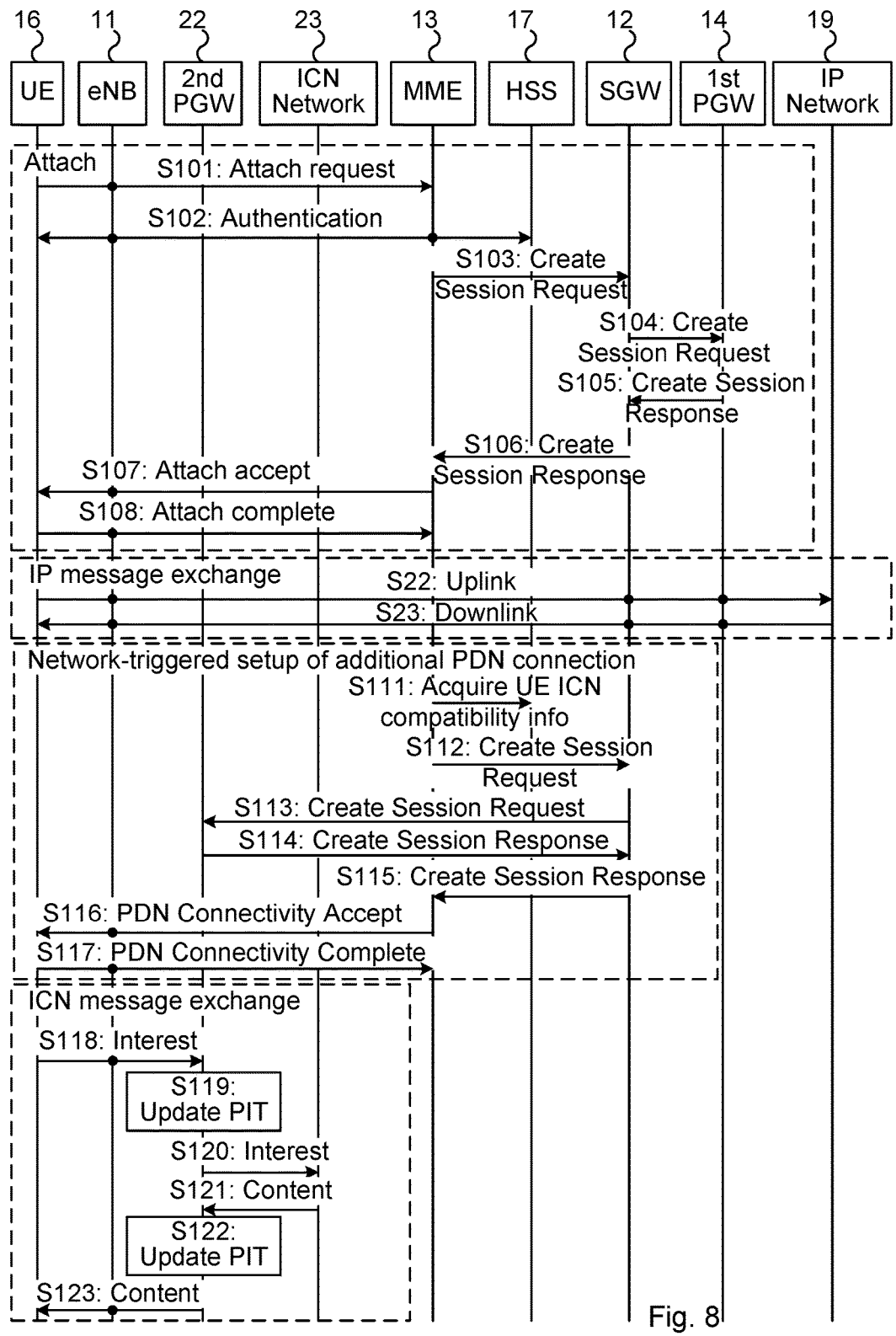
FIG. 8 illustrates a sequence diagram according of an embodiment where the network initiates the establishment of the ICN PDN connection with the wireless communication device.

FIG. 8 illustrates a sequence diagram according of an embodiment where, in contrast to the embodiments described with reference to FIGS. 6 and 7, the MME 13 of the network 10 initiates the establishment of the ICN PDN connection with the UE 16, rather than the UE 16 itself.

In step S101, the UE 16 initiates establishment of a PDN connection with the network 10 by submitting an Attach Request to the MME 13 via the eNodeB 11, which Attach Request indicates that the requested PDN connection for instance is of the type IPv4, IPv4v6 or IPv6.

Upon receiving the Attach Request, the MME 13 optionally performs an authentication procedure S102 with the UE 16 and the HSS 17, for instance by verifying that an IMSI of the UE 16 is registered with the HSS 17.

Thereafter, in S103, the MME 13 submits a Create Session Request to the SGW 12, indicating that a gateway supporting IP traffic is to be selected for setting up the IP PDN connection as indicated in the Attach Request initially submitted in step S1. Hence, the Create Session Request of S103 to the SGW 12 may contain the address of the first PGW 19.

In step S104, the Create Session Request is thus sent from the SGW 12 to the first PGW 19, which responds with a Create Session Response in step S105. The SGW 12 further submits the Create Session Response in step S106 to the MME 13, which contains information such as the address to the IP PDN 19.

As a final step of establishing the IP PDN connection with the PDN network 19, the MME 13 sends, via the eNodeB 11, an Attach Accept message to the UE 16 in step S107, which responds with an Attach Complete message in step S108.

The UE 16 may thus, via the eNodeB 11, the SGW 12 and the first PGW 19, exchange IP data with the IP PDN network 19 in the uplink in step S109, and in the downlink in step S110, over the PDN connection set up through steps S101-S108.

In this embodiment, the MME 13 triggers the establishment of an ICN PDN connection with the UE 16. It may be envisaged that that the MME 13 acquires information e.g. from stored subscription data received from the UE 16 or the HSS 17 in step S111 as to whether the UE 16 is ICN compatible.

It may be envisaged that a Subscriber Identity Module (SIM) inserted in the UE 16 contains information as to whether the UE 16 is capable of ICN communication or not. That is, whether the UE is configured with ICN functionality and whether the UE further is authorized to access one or more ICN networks.

Network-initiated PDN connection could be used e.g. in deployment scenarios where network ICN support comes and goes along with the UE 16 moving. In such scenario, the network 10 may initiate to setup or re-setup the ICN PDN connection once the UE 16 is in an area where the network supports ICN.

The UE 16 may thus detect that ICN again is supported, e.g. in a handover command or from reading system information in a target cell.

In this embodiment, the MME 13 will trigger the establishment of the ICN PDN connectivity with the UE 16 upon acquiring information in step S111 that the UE 16 indeed is capable of handling ICN data.

In step S112, the MME 13 initiates establishment of a PDN connection by submitting a Create Session Request to the SGW 12 indicating the (selected) second PGW 22. Hence, with the submitted Create Session Request, an ICN gateway in the communication network is selected via which the ICN data subsequently should be transported between the UE 16 and the ICN PDN 23.

The SGW 12 accordingly sends the Create Session Request to the selected ICN gateway—i.e. the second PGW 22—in step S113. The second PGW 24 responds with a Create Session Response in step S114, and the SGW 12 further sends the Create Session Response to the MME 13 in step S115.

As a final step of establishing the PDN connection with the PDN-type ICN network 23, the MME 13 sends, via the eNodeB 11, a PDN Connectivity Accept message to the UE 16 in step S116 indicating that the network 10 indeed is capable of setting up the PDN connection with the ICN network 113.

Optionally, this message could indicate an ID of the second PGW 22 used for the PDN connection. The UE 16 responds with a PDN Connectivity Complete message in step S117.

Advantageously, a PDN connection has been established between the UE 16 and the ICN network 23 with the second PGW 22 serving as an ICN network gateway.

FIG. 8 further illustrates exchange of ICN messages between the UE 16 and the ICN network 23, and delivery of requested ICN content. Hence, after the ICN PDN connection to the ICN network 23 has been setup throughout steps S111-S117, the UE 16 sends an interest via the eNodeB 11 to the ICN network 23 (i.e. in practice to an ICN node in the ICN network) in step S118, thereby requesting ICN content.

As previously discussed, any node routing interests to an ICN network keeps a record of the interest messages is has forwarded (i.e. where it came from and what Content Object it was naming) in their PIT. As a consequence, the second PGW 21 updates in step S119 its PIT in the light of the interest that just was received from the UE 16.

In step S120, the interest is forwarded to an ICN node in the ICN network 23, which in its turn may forward the interest to further ICN nodes until the requested content is found. Subsequently, in step S121, the ICN network 23 submits the requested content to the second PGW 22, which again updates the PIT in step S122, and forwards the requested content to the UE 16 via the eNodeB 11 in step S123.

As has been described with reference to FIGS. 6-8, the indication whether a PDN connection can be setup with the ICN network 23 via the MME 13 of the network 10 may be provided to the UE 16 in an Authentication message, an Attach Accept message, a Detach Accept message, or a PDN Connectivity Accept message.

It may further be envisaged that such an indication to the UE 16 could be provided in e.g. an RRC Connection Reconfiguration message, wherein the indication would be associated with a bearer (Data Radio Bearer), whose establishment is acknowledged. If the indication is provided by the network node 13, it could be included in the Initial Context Setup Request message, an E-RAB ("E-UTRAN Radio Access Bearer") Setup Request or an E-RAB Modify Request S1AP message. Also such a network node-provided indication would be associated with a bearer belonging to a PDN connection.

Again with reference to FIG. 8, in embodiments of the invention, connectivity failure or disturbances are detected as will be described in the following.

In a first embodiment, it is detected that a request for ICN data failed to be delivered via the established PDN connection, wherein the request for ICN data is re-submitted upon detection of the failure to deliver the request. Hence, if it is detected that the ICN Interest submitted in step S118 appears to never have reached the second PGW 22 or the ICN network 23, it is advantageously re-submitted.

In a second embodiment, it is detected that requested ICN data failed to be delivered via the established PDN connection, wherein the request for ICN data is re-submitted upon detection of the failure to deliver the ICN data. Hence, if it is detected that the requested ICN Content which should have been delivered in steps S121 and S123 never reached the UE 16, the request is advantageously re-submitted.

In embodiments, the request for ICN data is sent over the already established PDN connection 21, or alternatively over a newly established PDN connection.

Figure 9:
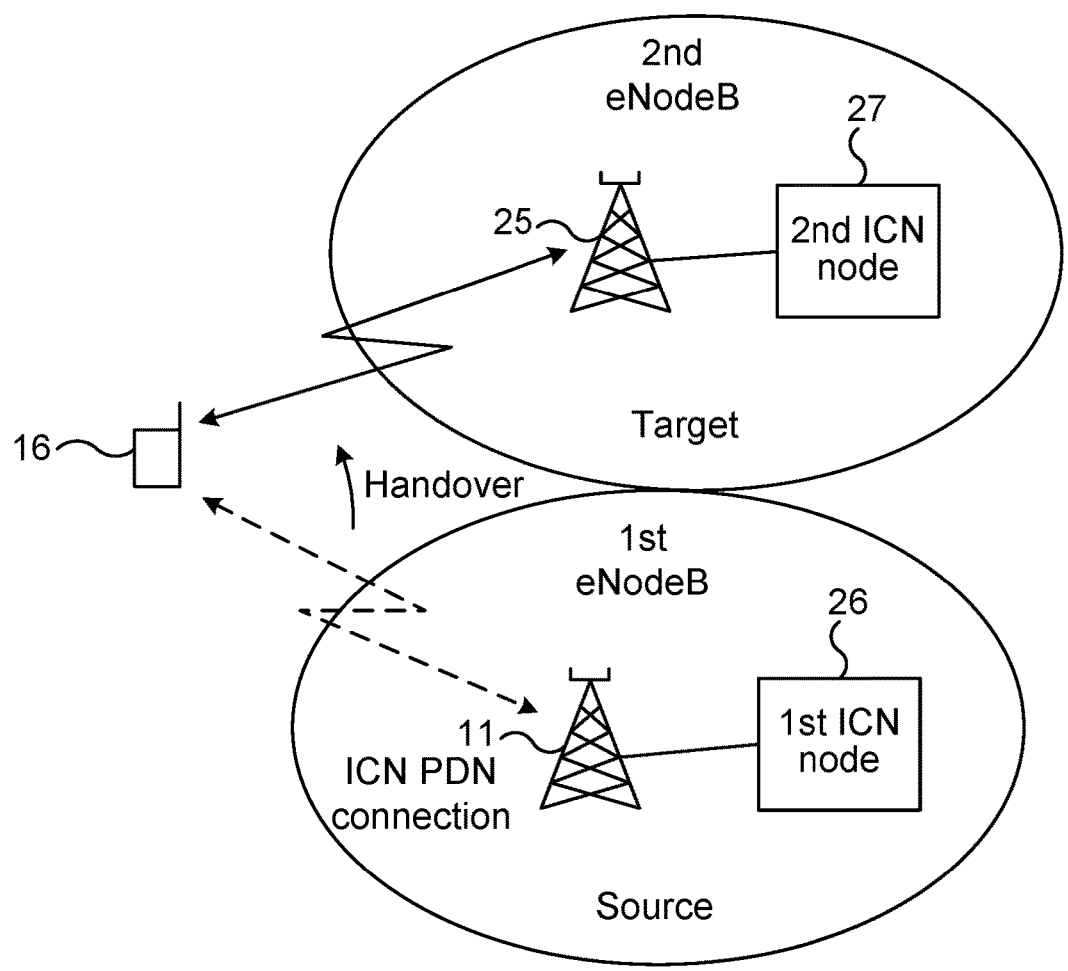
FIG. 9 illustrates a communication network where an embodiment is implemented at handover of a UE.

FIG. 9 illustrates an inter-cell handover scenario, where an embodiment of the invention is particularly advantageous.

It is assumed that the UE 16 has established a PDN connection with a first eNodeB 11 for receiving requested ICN data from a first ICN node.

Now, if the UE 16 enters a new coverage area, the PDN connection is handed over to a second eNodeB 25 in order to receive the requested (and any subsequently requested) ICN data from a second ICN node 27.

In this embodiment, when the UE 16 is informed by the MME (not shown in FIG. 9) of the inter-cell handover, the UE 16 re-submits any previously sent request for ICN data, which has not yet been served by the handover source cell, to the handover target cell. Hence, for any piece of requested content which has yet not been supplied by the first eNodeB 11, the request is re-submitted to the second eNodeB 25.

Further with reference to FIG. 9, even in a case of intra-cell handover, i.e. where the UE 16 is handed over from one channel to another of the same eNodeB, such as the first eNodeB 11, it may be that the ICN node of the ICN network with which the PDN connection was established before the intra-cell handover was performed no longer is available.

For instance, due to network deployment, certain ICN nodes may only be accessible in certain parts of a cell.

Hence, in another embodiment, when the UE 16 is informed by the MME of the intra-cell handover, and that ICN node ID has changed—i.e. the ICN node with which the PDN connection was established before the intra-cell handover was performed is no longer available—the UE 16 re-submits any previously sent request for ICN data, which has not yet been served, to the ICN node with which the PDN connection is established after the intra-cell handover.

In still a further embodiment, with reference to FIG. 3, even though a PDN connection 21 is established between the UE 16 and the ICN network 23, it may be that no bearer is activated on the PDN connection 21, in which case any requests for ICN data which has not yet been served by the ICN network are cancelled, wherein no new requests for ICN data are sent over the PDN connection until a new radio bearer is set up.

Bearer is a logical construct to differentiate traffic within a PDN connection. Each PDN connection has at least one bearer (known as default bearer) and may have one or more additional bearers (known as dedicated bearers). In EPC, a bearer consists of three segments: radio bearer (UE-eNodeB), S1 bearer (eNodeB-SGW) and S5/S8 bearer (SGW-PGW).

If any one of these bearers are released, i.e. not activated, it is no longer possible to transport ICN data on the established PDN connection 21.

Inside the UE 16, the radio modem protocol stack 161 sends a trigger message to the ICN protocol stack 162 when a bearer used for ICN traffic is released. The bearer release can be forced centrally from the network, when the terminal goes into flight mode, at power off, or by bearer release or PDN release requests submitted from the network, etc.

Any of the following messages will release a bearer, and if ICN communication is associated with that bearer, a trigger will be sent to the ICN protocol stack 162 indicating a bearer release. The ICN protocol stack 162 may send this ICN release information up to the application stack 163 for informing that the network is disconnected.

1. Detach Request, may be sent from the network to force the UE to detach from the network;
2. Deactivate EPS Bearer Context Request, may be sent from the network as confirmation that PDN is disconnected;
3. RRC Connection Reconfiguration, may be sent from the eNodeB to the UE to change RRC parameters, for instance terminating the radio bearer; and
4. RRC Connection Release, may be sent from the eNodeB to the UE to release a radio bearer.

In case the ICN protocol stack 162 receives a "release bearer" trigger, i.e. a bearer release is detected over the PDN connection, the ICN stack 162 will cancel any requests for ICN data which has not yet been served by the ICN network, wherein no new requests for ICN data are sent over the PDN connection until a new bearer is set up.

Figure 10:
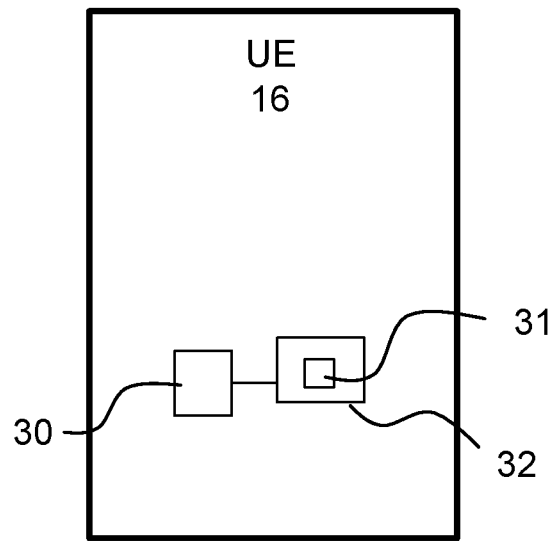
FIG. 10 illustrates a wireless communication device according to an embodiment.

With reference to FIG. 10, the steps of the method performed by the UE 16 according to embodiments are in practice performed by a processing unit 30 embodied in the form of one or more microprocessors arranged to execute a computer program 31 downloaded to a suitable storage medium 32 associated with the microprocessor, such as a Random Access Memory (RAM), a Flash memory or a hard disk drive. The processing unit 30 is arranged to cause the UE 16 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

Figure 11:
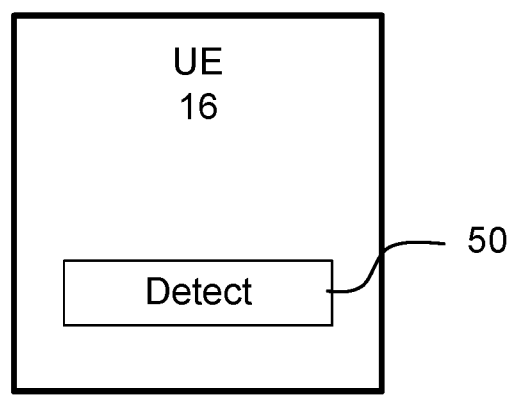
FIG. 11 illustrates a wireless communication device according to another embodiment.

FIG. 11 illustrates a wireless communication device in the form of a UE 16 configured to enable establishment of at least one PDN connection with a communication network according to an embodiment.

The UE 13 comprises detecting means 50 adapted to detect whether connectivity to an ICN network is available via the at least one PDN connection for transporting ICN data.

The detecting means 50 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed at a wireless communication device of enabling establishment of at least one Packet Data Network (PDN) connection with a communication network, comprising:

submitting, to a node of the communication network, a request to establish the at least one PDN connection with an Information Centric Networking (ICN) network;

receiving, from the node of the communication network, a message indicating whether the communication network is capable of establishing the at least one PDN connection with the ICN network for transporting ICN data, wherein at least one of the submitted request or the message provides an identifier of a specific ICN network; and detecting, based on the message, whether connectivity to the ICN network is available to the wireless communication device via the at least one PDN connection for transporting ICN data.

2. The method of claim 1, the submitted request further comprising information identifying at least one ICN network with which the at least one PDN connection is requested to be established for transporting ICN data.

3. The method of claim 2, further comprising:

detecting that a request for ICN data failed to be delivered via the established PDN connection; and re-submitting, upon detecting the failure to deliver the request, the request for ICN data.

4. The method of claim 1, the received message further comprising information identifying at least one ICN network with which the at least one PDN connection is established for transporting ICN data.

5. The method of claim 1, wherein the message indicates that the at least one PDN connection with the ICN network is established for transporting ICN data.

6. The method of claim 1, further comprising:

submitting any pending requests for ICN content upon receiving the message indicating that the at least one PDN connection with the ICN network is established for transporting ICN data.

7. The method of claim 1, further comprising:

detecting, based on a second message, whether connectivity to the ICN is no longer is available via the at least one PDN connection for transporting ICN data.

8. The method of claim 1, further comprising:

receiving, from a node of the communication network, an indication that an inter-cell handover of the wireless communication device is performed from a source cell to a target cell; and re-submitting any previously sent request for ICN data, which has not yet been served by the handover source cell, to the handover target cell.

9. The method of claim 1, further comprising:

detecting a bearer release over the at least one PDN connection; and cancelling any requests for ICN data which has not yet been served by the ICN network, wherein no new requests for ICN data are sent over the at least one PDN connection until a new bearer is set up.

10. A wireless communication device configured to enable establishment of at least one Packet Data Network (PDN) connection with a communication network, the wireless communication device comprising:

a processing unit and a memory, said memory containing instructions executable by said processing unit to performs operations comprising:

submitting, to a node of the communication network, a request to establish the at least one PDN connection with an Information Centric Networking (ICN) network;

receiving, from the node of the communication network, a message indicating whether the communication network is capable of establishing the at least one PDN connection with the ICN network for transporting ICN data, wherein at least one of the submitted request or the message provides an identifier of a specific ICN network; and detecting, based on the message, whether connectivity to the ICN network is available to the wireless communication device via the at least one PDN connection for transporting ICN data.

11. The wireless communication device of claim 10, the operations further comprising:

including, in the submitted request, information identifying at least one ICN network with which the at least one PDN connection is requested to be established for transporting ICN data.

12. The wireless communication device of claim 11, the operations further comprising:

detecting that a request for ICN data failed to be delivered via the established PDN connection; and to re-submitting, upon detecting the failure to deliver the request, the request for ICN data.

13. The wireless communication device of claim 10, the operations further comprising:

receiving, with the message, information identifying at least one ICN network with which the at least one PDN connection is established for transporting ICN data.

14. The wireless communication device of claim 10, wherein the message indicates that the at least one PDN connection with the ICN network is established for transporting ICN data.

15. The wireless communication device of claim 10, the operations further comprising:

submitting any pending requests for ICN content upon receiving the message indicating that the at least one PDN connection with the ICN network is established for transporting ICN data.

16. The wireless communication device of claim 10, the operations further comprising:

detecting, based on a second message, whether connectivity to the ICN network no longer is available via the at least one PDN connection for transporting ICN data.

17. The wireless communication device of claim 10, the operations further comprising:

receiving, from a node of the communication network, an indication that an inter-cell handover of the wireless communication device is performed from a source cell to a target cell; and to re-submitting any previously sent request for ICN data, which has not yet been served by the handover source cell, to the handover target cell.

18. The wireless communication device of claim 10, the operations further comprising:

detecting a bearer release over the at least one PDN connection; and cancelling any requests for ICN data which has not yet been served by the ICN network, wherein no new requests for ICN data are sent over the at least one PDN connection until a new bearer is set up.

19. A non-transitory computer readable medium having computer-executable instructions that are executable to perform operations comprising:

submitting, to a node of the communication network, a request to establish at least one Packet Data Network (PDN) connection with an Information Centric Networking (ICN) network;

receiving, from the node of the communication network, a message indicating whether the communication network is capable of establishing the at least one PDN connection with the ICN network for transporting ICN data, wherein at least one of the submitted request or the message provides an identifier of a specific ICN network; and detecting, based on the message, whether connectivity to the ICN network is available to a wireless communication device via the at least one PDN connection for transporting ICN data.

* * * * *